(12) United States Patent
Linford et al.

(10) Patent No.: US 6,855,772 B2
(45) Date of Patent: Feb. 15, 2005

(54) WATER-REPELLENT AND SOIL-RESISTANT FINISH FOR TEXTILES

(75) Inventors: Matthew L. Linford, Orem, UT (US); David S. Soane, Piedmont, CA (US); David A. Offord, Castro Valley, CA (US)

(73) Assignee: Nano-Tex, LLC, Emeryville, CA (US)

( * ) Notice: Subject to any disclaimer, the term of this patent is extended or adjusted under 35 U.S.C. 154(b) by 69 days.

(21) Appl. No.: 10/269,271

(22) Filed: Oct. 11, 2002

(65) Prior Publication Data

US 2003/0101522 A1 Jun. 5, 2003

Related U.S. Application Data

(60) Division of application No. 10/093,174, filed on Mar. 6, 2002, now Pat. No. 6,544,594, which is a continuation-in-part of application No. PCT/US00/24691, filed on Sep. 8, 2000.
(60) Provisional application No. 60/153,393, filed on Sep. 10, 1999, and provisional application No. 60/176,949, filed on Jan. 18, 2000.

(51) Int. Cl.$^7$ ..................... C08F 259/00; C08F 295/00; C08L 33/02
(52) U.S. Cl. ..................... 525/276; 525/299; 525/301; 525/199; 525/200; 525/201; 525/221
(58) Field of Search ................. 525/276, 299, 525/301, 199, 200, 201, 221

(56) References Cited

U.S. PATENT DOCUMENTS

| | | | |
|---|---|---|---|
| 3,467,612 A | 9/1969 | Gagliardi | 260/29.6 |
| 3,651,105 A | 3/1972 | Sweeney et al. | 260/414 |
| 3,997,507 A | 12/1976 | Kirimoto et al. | 260/63 |
| 4,229,524 A * | 10/1980 | Yoneyama et al. | 430/536 |
| 4,695,488 A | 9/1987 | Hisamoto et al. | 427/385.5 |
| 5,308,511 A | 5/1994 | Coppens et al. | 252/8.6 |
| 5,516,337 A | 5/1996 | Nguyen | 8/557 |
| 5,744,201 A | 4/1998 | Chang et al. | 427/393.4 |
| 6,197,378 B1 * | 3/2001 | Clark et al. | 427/315 |

FOREIGN PATENT DOCUMENTS

| | | |
|---|---|---|
| EP | 0 333 083 A | 9/1989 |
| EP | 0 572 269 A | 12/1993 |
| EP | 0 710 738 A | 5/1996 |
| JP | 55-076171 | 6/1980 |
| JP | 57-149557 | 9/1982 |
| JP | 58-214587 | 12/1983 |
| JP | 61-127343 | 6/1986 |
| JP | 61-266667 | 11/1986 |
| JP | 09-176961 | 7/1997 |
| SU | 1351983 | 11/1987 |
| WO | WO 01/18305 | 3/2001 |

OTHER PUBLICATIONS

U.S. patent application Ser. No. 10/093,174, filed Mar. 6, 2002.
U.S. patent application Ser. No. 10/299,512, filed Nov. 18, 2002.
Translation of JP 57–149557, Sep. 1982.

* cited by examiner

Primary Examiner—Samuel A. Acovah
Assistant Examiner—Olga Asinovsky
(74) Attorney, Agent, or Firm—Burns, Doane, Swecker & Mathis, LLP

(57) ABSTRACT

The present invention is directed to polymeric treatment preparations for textiles and other fibrous substrates that impart water and oil repellency to fibers, yarns, textiles, or other fibrous substrates. More particularly, this invention comprises an aqueous solution, emulsion or suspension of (a) a fluorinated polymer that contains reactive groups that can complex with metal atoms that have a formal charge of 2 or greater, and (b) one or more metal atoms that have a formal charge of 2 or greater. The invention is further directed to the process for treating fibrous substrates with textile preparations in one step that provide water/soil repellency that is durable to repeated cleanings and to abrasion. This invention is further directed to the yarns, fibers, fabrics, textiles, webs, finished goods, or nonwovens (encompassed herein under the terms "textiles" and "fibrous substrates") treated with the textile-reactive water- and soil-resistant preparation of the invention. Such fibrous substrates exhibit a greatly improved, durable water and soil repellency or resistance, even after multiple launderings.

11 Claims, No Drawings

WATER-REPELLENT AND SOIL-RESISTANT FINISH FOR TEXTILES

The present invention is a continuation-in-part of co-pending International Patent Appln. No. PCT/US00/24691, filed Sep. 8, 2000 and designating the United States of America, which application claims the benefit of Provisional U.S. application Ser. No. 60/153,393, filed Sep. 10, 1999 and of Provisional U.S. application Ser. No. 60/176,949, filed Jan. 18, 2000; the entire disclosures of all of which are incorporated herein by reference.

FIELD OF THE INVENTION

The present invention relates to textile treatment compositions for imparting water/soil resistance to fibrous substrates, including textiles.

BACKGROUND OF THE INVENTION

Two methods of imparting hydrophobic character to textiles have been investigated in the past: 1) hydrophobic polymer films, and 2) attachment of hydrophobic monomers and polymers via physi- or chemisorptive processes.

Current commercial processes for producing water-repellent/soil-resistant fabrics are mainly based on the laminating processes of companies such as W. L. Gore and Sympatex (*Journal of Coated Fabrics* vol. 26, 1996, pp. 107–130) and polysiloxane coatings (*Handbook of Fiber Science and Technology*, Marcel Dekker, New York, N.Y., Vol. II, 1984, pp. 168–171). The laminating process involves adhering a layer of polymeric material (such as Teflon™ that has been stretched to produce micropores) to a fabric. Although this process produces durable repellent films, it suffers from many disadvantages. The application of these laminants requires special equipment and therefore cannot be applied using existing textile production processes. Synthesis of the film is costly and garments with this modification are significantly more expensive than their unmodified counterparts. The colors and shades of this clothing are limited by the coating color. Finally, clothing made from this material tends to be heavy and stiff. Polysiloxane films suffer from low durability to laundering, which tends to swell the fabric and rupture the silicone film. The polysiloxanes have a cost advantage over the laminates, which are, however, more durable to laundering and dry-cleaning.

Repellents based on monomeric hydrocarbon hydrophobes can be broken down into five categories: 1) aluminum and zirconium soaps, 2) waxes and waxlike substances, 3) metal complexes, 4) pyridinium compounds, 5) methylol compounds, and 6) other fiber-reactive water repellents. Compared to polymeric coatings, monomeric hydrophobes can penetrate within the fabric to produce a more durable coating.

One of the oldest water repellents was based on non-covalently applying water-soluble soap to the fibers and precipitating it with an aluminum salt (*J. Text. Res.* vol. 42, 1951, p. 691). These coatings dissolved in alkaline detergent solution, therefore washfastness was poor. Zirconium soaps were less soluble in detergent solutions (*Waterproofing and Water-Repellency*, Elsevier Publ. Co., Amsterdam, 1963, p. 188), but due to the noncovalent nature of attachment to the fabric, abrasion resistance was poor.

The oldest and most economical way to make fabric water repellent is to coat it with a hydrophobic substance, such as paraffin (*Text. Inst. Ind.* vol. 4, 1966, p. 255). This process is still in practice today and paraffin emulsions for coating fabrics can be purchased (e.g., Freepel® from BFGoodrich Textile Chemicals, Inc.). Waxes are not stable to laundering or dry cleaning. Durability is poor due to their noncovalent nature of binding and their breathability is low.

Quilon chrome complexes polymerize to form —Cr—O—Cr— linkages (*Tappi* vol. 36, 1953, p. 107). Simultaneously, the complex forms covalent bonds with the surface of fibers with hydrophobic chains directed away from the surface to produce a water repellent, semi-durable coating. Quilon solutions require acidic conditions to react, thus causing degradation of the cellulose fibers through cellulose hydrolysis. Fabric colors are limited by the blue-green coloration imparted by the metal complex.

The extensive history of pyridinium-type water repellents has been reviewed by Harding (*J. Text. Res.* vol. 42, 1951, p. 691). In essence, an alkyl quaternary ammonium compound is reacted with cellulose at elevated temperatures to form a durable water-repellent finish on cotton (Br. Pat. 466,817) and a later version was marketed under the trademark Velan PF by ICI. It was later found that the reaction was restricted to the surface of the fibers (*J. Soc. Dyers Colour.* vol. 63, 1947, p. 260) and the high cure temperature weakened the fabric. Sodium acetate had to be added to prevent the decomposition of the cellulose by the HCl formed. Also, the pyridine liberated during the reaction has an unpleasant odor and the fabric had to be scoured after the cure. The toxicological properties of pyridine ended its use in the 1970s when government regulations on such substances increased.

Methylol chemistry has been extensively commercialized in the crosslinking of cellulose for durable press fabrics. N-methylol compounds are prepared by reaction of an amine or amide with formaldehyde. Alkyl-N-methylol compounds can be reacted at elevated temperatures in the presence of an acidic catalyst with the hydroxyl groups of textiles to impart durable hydrophobic qualities (Br. Pats. 463,300 and 679,811). The reaction is accompanied by formation of non-covalently linked (i.e., non-durable) resinous material, thus decreasing efficiency. In addition, the high temperature and acid catalyst reduce the strength of the fabric. Recently, the commercial use of methylol compounds has been waning due to concerns of toxic formaldehyde release from fabrics treated in such a manner.

Several other chemical reactions have been used to covalently attach hydrophobic species to cotton to produce a water-repellent finish but have not been commercialized for various reasons. Long-chain isocyanates have been used in this respect (Br. Pat. 461,179; *Am. Dyest Rep.* vol. 43,1954, p. 453; Br. Pat. 474,403). The high toxicity of isocyanates and significant side reactions with water, however, precluded it from commercial use. To circumvent the water sensitivity of isocyanates, alkyl isocyanates were reacted with ethylenimine to yield the less reactive aziridinyl compound, which was subsequently reacted with cellulose at 150° C. (Ger. Pat. 731,667; Br. Pat. 795,380). Although the toxicity of the aziridinyl compound was reduced compared to the isocyanate, the procedure still required the handling of toxic isocyanate precursors. Also, the high cure temperature weakened the cellulose, and crosslinkers were needed to increase structural stability. Alkyl epoxides can be reacted with cellulose under acidic or basic conditions to produce durable, water-repellent cotton (Ger. Pat. 874,289). The epoxide was applied from a volatile solvent to suppress side reactions with water. Epoxides are, in general, not very reactive, thus requiring long reaction times at high temperatures. Therefore, they have not been commercialized. Acylation of cotton with isopropenyl stearate from an acidic solution of benzene and curing at 200° C. produced a durable hydrophobic coating (U.S. Pat. No. 4,152,115). The high cure temperature and acid catalyst again weakened the cotton. Carcinogenic benzene can be replaced by toluene, but the practicality of using flammable solvents in fabric finishing is limited. Alkyl vinyl sulfones react with cellulose in the presence of alkali to form a repellent finish (U.S. Pat. No. 2,670,265). However, this method has not been commercialized because the alkali is not compatible with crosslinking reactants required for permanent press treatments.

Recently, copolymers containing a fluorinated monomer, an alkyl monomer, a reactive monomer (e.g., hydroxyethylmethacrylate, N-methylol acrylamide), and various other auxiliary monomers (e.g. vinylidene chloride, polyethylene glycol methacrylate, etc.) have become popular commercial products for the aqueous application of somewhat durable water and oil repellent finish to textiles (e.g., Zonyl™ by DuPont, Nuva™ by Clariant, and Scotchgard™ by 3M). These polymers, however, suffer from the release of formaldehyde from the treated fabric due to the breakdown of the N-methlyol acrylamide portion of the copolymer.

The use of mordants (insoluble metal complexes) have been used to permanently attach fluorinated compounds (containing groups such as acids capable of forming insoluble complexes with the mordant metal) to a textile substrate. The mordant approach of attaching the fluorinated compound to the substrate eliminates the use of the formaldehyde-releasing components described above. U.S. Pat. No. 3,651,105 uses a solvent-soluble fluorinated metal complex that is applied to paper and fabric. This complex is monomeric, so it only has one point of attachment as opposed to multiple attachment points afforded by a polymer. But, more importantly, this complex is only soluble in a carbon tetrachloride/isopropanol mixture. The use of toxic and flammable solvents in a textile process is impractical. Water-soluble complexes are preferred. U.S. Pat. No. 3,467,612 uses a water-soluble fluoropolymer/metal complex but the fluoropolymer does not contain any monomers capable of complexing with a divalent metal to bridge to a substrate. However, although the fluorinated complex is insolubilized on the fabric, it is not directly bound to a group on the substrate; thus durability to abrasion is low. Other patents using divalent metals use a two-step process where the metal is applied to the fabric first and then the fluoropolymer containing a monomer capable of complexing a divalent metal is applied to the fabric in a second step. EP 0710738 teaches a two-step process: application of a divalent metal followed by application of a random fluoro-copolymer (containing monomers capable of binding the divalent metal). The use of two steps greatly decreases the utility of this approach due to cost issues. U.S. Pat. No. 5,744201 uses a water-soluble random fluoro-copolymer with an acid-containing monomer that is rendered insoluble (and thus precipitated on the fabric) by changing the pH in the presence of ammonium ion (single valent). The copolymer and the ammonium ion form an insoluble complex at a specific pH and is not directly bound to a group on the substrate; thus durability to abrasion is low. EP 572269A1 is similar except for the use a polyallylamine salt instead of ammonium. This patent also mentions the use of monomeric fluorinated zirconium compounds as additives to boost performance. U.S. Pat. No. 4,695,488 incorporates acrylic acid in their fluoropolymer to increase soil release properties but do not use this acid group to form insoluble divalent salt linkages to the fabric substrate. The purpose of the acid groups is to increase the soil-release properties of the finish.

SUMMARY OF THE INVENTION

This invention is directed to treatment preparations useful for the treatment of fibrous substrates, such as textiles and other webs, to provide substantially permanent, durable water and soil repellency to keratinous and/or cellulosic fibrous substrates. More particularly, the invention is directed to preparations that comprise a fluorinated polymer and metal atoms, typically as a metal salt. The claimed fluorinated copolymer incorporates the divalent metal salt but is still water-soluble (because of water-soluble monomers in the polymer and surfactants), allowing for a one-step application of both the fluoropolymer and metal. The divalent metal will complex with groups on the fabric to make an insoluble complex on the fabric that is directly bound to the substrate of the fabric for increased abrasion durability. Furthermore, the claimed fluorinated copolymer is a block copolymer in which the polymer has long stretches of only fluoromonomer and long stretches of monomers capable of complexing divalent metals. This increases the water solubility of the polymer of the present invention and increases the strength with which the polymer binds to the fiber through a divalent metal.

In a first embodiment, the preparations of the invention comprise (a) a fluorinated carboxylate-functionalized fluoropolymer and (b) a metal salt, or mordant.

In a second embodiment, this invention comprises a solution, emulsion or suspension of (a) a fluorinated polymer that contains functional moieties or reactive groups that can complex with metal atoms that have a formal charge of 2 or greater, and (b) one or more metal atoms that have a formal charge of 2 or greater.

By "fluorinated polymer" or "fluoropolymer" is meant that the polymer will contain some perfluorinated or partially fluorinated alkyl chains to impart water and oil repellency to coated objects. It may additionally be advantageous for the polymer to contain other groups such as normal alkyl chains; groups that can increase the water solubility or stability of the suspension of the polymer, such as chains of polyethylene glycol or other polar groups; one or more different groups that can crosslink to each other or to the material being coated; or groups that increase polymer flexibility, flame retardancy, the softness of a textile, or resistance to bacteria or mildew.

The metal atoms in the solution of the second embodiment can come from two sources. Either they are part of a monomer that is copolymerized to become part of the polymer, such as calcium, magnesium, aluminum, or chromium acrylate; or they are added in the form of a compound that has a metal with a formal charge of 2 or greater. This addition of the metal can take place before polymerization, during polymerization, or after polymerization. Without being bound by theory, it is believed that the metal atoms may complex with keratinous or any other fibrous substrates that contain free carboxyl groups. By "complexing" is meant that the polymer will form a coordination bond with the metal and the metal will form a coordination bond to the fiber, textile, or web to be treated. Alternatively, again without being bound by theory, the metal atoms may act to crosslink the polymer to itself and to other chains to make the polymer insoluble in the fibrous substrate. In either case, the resulting water/soil repellent preparation has more durable water and soil repellency in and/or on the substrate fiber structure while retaining the natural properties of the fibrous substrate.

This invention is further directed to a novel block copolymer containing i) one or more blocks composed primarily of acrylic acid, methacrylic acid, maleic anhydride, maleic acid, crotonic acid, itaconic acid, or other acid-containing monomers, and ii) one or more blocks that contain a significant amount of a fluorinated monomer that is capable of binding to wool or other fibrous substrates with a metal. They may further comprise a monomer that contains a metal, such as calcium, magnesium, aluminum, potassium, or chromium acrylates or styrene sulfonates.

This invention is further directed to the yarns, fibers, fabrics, textiles, webs, finished goods, or nonwovens (encompassed herein under the terms "textiles" and "fibrous substrates") treated with the water- and soil-resistant preparations of the invention. Such fibrous substrates exhibit a greatly improved, durable water and soil repellency. By "durable water and soil repellency" is meant that the fibrous substrate will exhibit a repellency or resistance to water and oily soils even after multiple launderings.

Methods are provided for treating fabrics and other fibrous substrates with permanent water/soil repellent coatings.

DETAILED DESCRIPTION OF THE INVENTION

The preparations of the invention comprise a combination of metal atoms, typically as a metal salt, and a metal-reactive fluorinated polymer capable of imparting a water/soil-resistant property to textiles and other fibrous substrates. The metal imparts greater stability and durability to the polymer when the polymer is immobilized on the substrate than when the metal is not present.

The fluorinated monomers, oligomers or macromonomers of the durable water/soil-resistant fluoropolymer are selected from those groups that will provide the necessary water/soil resistance and can be polymerized. Examples include fluorinated monomers of acrylates, methacrylates, alkenes, alkenyl ethers, styrenes, and the like. Monomers that contain carbon-fluorine bonds that would be useful in this invention include, but are not limited to, Zonyl TA-N (an acrylate from DuPont), Zonyl TM (a methacrylate from DuPont), FX-13 (an acrylate from 3M), and FX-14 (a methacrylate from 3M). The fluoropolymers may include $—CF_3$ and $—CHF_2$ end groups, perfluoroisopropoxy groups ($—OCF(CF_3)_2$), 3,3,3-trifluoropropyl groups, and the like. The polymers may include vinyl ethers having perfluorinated or partially fluorinated alkyl chains. The fluoropolymer preferably comprises one or more fluoroaliphatic radical-containing monomers having the structure of Formula I, below:

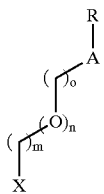

Formula I

In the compound of Formula I, for example:
  m is 0 to 2;
  n is 0 or 1;
  o is 1 or 2;
  A is $—SO_2—$, $—N(W)—SO_2—$, $—CONH—$, $—CH_2—$, or $—CF_2—$;
  R is a linear, branched, or cyclic fluorocarbon, including fully or partially fluorinated hydrocarbons, wherein R may be, for example, a $C_1$ to $C_{30}$ fluorocarbon;
  W is hydrogen or $C_1-C_4$ lower alkyl; and
  X is acrylate ($H_2C=CHCO_2—$), methacrylate ($H_2C=C(CH3)CO2-$), or a carbon-carbon double bond ($H_2C=CH—$).

Particularly useful fluorinated monomers are acrylate and methacrylate monomers with the structures $H_2C=CHCO_2CH_2CH_2(CF_2)_nF$ and $H_2C=C(CH_3)CO_2CH_2CH_2(CF_2)_nF$, where n in both cases is 1 to 20. More preferably n lies between approximately 5 and 12, although most commercially available monomers contain a distribution of chain lengths and a few of them may fall outside of this range.

The preferred embodiment of this invention is a fluoropolymer prepared by the emulsion process in water or in a mixture of water and an organic solvent that is then dissolved or suspended in water or into a solution in which water is a significant component.

The reactive groups on the water/soil-resistant fluoropolymer are selected from those groups that will coordinately bind strongly with a metal. Such moieties include, but are not limited to, carboxyl, carboxylate, sulfate, sulfonate, phosphate, and phosphonate groups. For example, the metal-reactive monomers may be selected from groups that contain carboxylates such as acrylic acid, methacrylic acid, bisacrylamidoacetic acid, 3-butene-1,2,3-tricarboxylic acid, maleic acid, 2-carboxyethyl acrylate, itaconic acid, 4-vinylbenzoic acid, and the like; or sulfonates such as 2-acrylamido-2-methyl-1-propanesulfonic acid, 2-methyl-2-propene-1-sulfonic acid, 2-propene-1-sulfonic acid, 2-sulfoethyl methacrylate, 3-sulfopropyl methacrylate, vinylsulfonic acid, styrene sulfonic acid, styrene sulfonic acid (sodium salt), and the like; or phosphates or phosphonates such as vinyl phosphonic acid or vinyl phosphoric acid, and the like. In one embodiment of the invention, particularly useful monomers, macromonomers, oligomers, or polymers are those that have carboxyl-containing monomers copolymerized with at least some fluorinated monomers or polymers.

A monomer such as styrene sulfonate or potassium acrylate may be used where an additional metal atom with a formal charge of 2 or greater may be added before, during, or after polymerization.

Ideally, the actual metal-polymer salt would be water-soluble or at least have some water solubility. When dried properly, hydrophobic groups in the polymer would orient themselves in such a way as to imbed or surround metal-anion complexes. When metals with a formal charge of 2 or greater are used, polymer crosslinking providing added stability, could result.

The metal salt is chosen from those that form an insoluble or nearly insoluble complex with the polymer, especially when the polymer is dried or cured. Preferred are metal salts that also react or complex with the surface of the fiber of the textile or web. Preferred examples of metal salts that can be added to the polymer prior to, during or after polymerization include calcium (II), magnesium (II), zirconium (IV), aluminum (III), and chromium (III) salts such as calcium chloride ($CaCl_2$), calcium sulfate ($CaSO_4$), calcium nitrate ($Ca(NO_3)_2$), magnesium chloride ($MgCl_2$), magnesium sulfate ($MgSO_4$), magnesium nitrate ($Mg(NO_3)_2$), zirconium oxychloride ($ZrOCl_2$), zirconium nitrate ($Zr(NO_3)_4$), zirconium sulfate ($Zr(SO_4)_2$), zirconyl nitrate ($ZrO(NO_3)_2$), aluminum sulfate ($Al_2(SO_4)_3$), aluminum potassium sulfate (alum) ($AlK(SO_4)_2$), aluminum nitrate ($Al(NO_3)_3$), chromium acetate ($Cr(CH_3COO)_3$), chromium nitrate ($Cr(NO_3)_3$), chromium sulfate ($Cr_2(SO_4)_3$), and chromium oxalate ($Cr_2(C_2O_4)_3$). Less preferred examples of metals would include any compound that contains a metal with a formal charge greater than 1. If the metal salt forms an insoluble complex with a monomer, it will be preferred to add the metal during or after polymerization.

In the preferred embodiment of this invention, one or more surfactants will be present during the polymerization and with the dissolved or suspended polymer. The surfactant will keep water-insoluble monomers in solution during polymerization, and later to keep the entire polymer in solution. Presently preferred are the non-ionic surfactants, such as those with the structures $CH_3(CH_2)_nCO(OCH_2CH_2)_mOH$ (such as, for example, polyethylene oxide (14) monostearate, $CH_3(CH_2)_n(OCH_2CH_2)_mOH$, and those with trade names that include "Tween", or "Triton".

It is also possible to add additional monomers into the polymer. These monomers may act as dyes, pH indicators, softeners, compounds that would give the fibrous substrate resistance to fungi or bacteria, spacers to make the polymer more flexible, components to increase the solubility of the polymer in a carrier solvent system (e.g., mixtures of water, polar organic solvents, and surfactants) from which the polymer is deposited onto the fibrous substrates, or components (non-fluorinated) that add hydrophobicity. Such monomers are known to those of skill in the art. Examples of potential softeners that could soften the polymer and are commercially available include acrylic acid and methacrylic acid esters of alkyl chains or siloxane oligomers or polymers.

In a presently preferred embodiment, the treatment is selected from random copolymers consisting of a fluoroacrylate (e.g., FX-13, 3M; or Zonyl TA-N, DuPont) containing at least two carboxyl-containing monomers, e.g., acrylic acid, per molecule, some vinylidene chloride, and/or PEG-acrylate, and the metal salt is $ZrO(NO_3)_2$. The metal salt and the fluoropolymer are added from an aqueous solution to the keratinous fabric in the normal manner (e.g., padding on of an aqueous solution containing the salt and the polymer, followed by drying at 90° C. to 175° C. for about 30 seconds to about 5 min). Without being limited by theory, it is believed that the zirconium salt complexes with carboxyl or carboxylate groups from aspartic acid and glutamic acid residues in the keratinous substrate while at the same time it reacts with the carboxyl-containing polymer, thus serving as a coordination bridge between the wool and the water/soil resistant polymer. The polymer may be linked by one or multiple carboxyls to the wool through the metal. Alternatively, the polymer may be crosslinked to itself and to other polymer chains by the mordant. It may also be that the mordant does not bind the polymer to the wool, but rather simply renders the polymer insoluble.

This invention is further directed to a diblock copolymer that contains one or more blocks of an acidic monomer, such as acrylic acid, along with one or more blocks of fluorinated monomers. This polymer is useful to coat fabrics using a metal. In a presently preferred embodiment, the hydrophilic monomers are concentrated to one end of the macromolecule. It is believed that this will increase its water solubility and improve its ability to bind to fabrics.

The synthesis of the copolymer comprises the steps of:

1) Polymerizing FX-13, Zonyl TA-N, or another monomer that does not contain a carboxyl group in the presence of a chain transfer agent that contains a sulfhydryl group and an amine group, one example being, but the invention not limited to, $HS(CH_2)_nNH_2$ (where n=2–20). Two commercially available compounds that have amino and thiol groups are 1-amino-2-methyl-2-propanethiol (sold by Aldrich as the hydrochloride) and 2-(butylamino)ethanethiol.

2) Reacting the amine-terminated polymer produced in Step 1) with a compound (such as N-acetyl homocysteine thiolactone or 2-iminothiolane, for example) that will convert the amine-terminated polymer into a sulfhydryl-terminated polymer.

3) Performing a polymerization in the presence of the sulfhydryl-terminated polymer produced in Step 2) with a monomer different from the monomer used in Step 1). Thus, the sulfhydryl-terminated polymer generated in Step 2) acts as a chain transfer agent for the polymer created in Step 3) and caps it, creating a block copolymer.

A graft copolymer may be made, where the grafted portion is either carboxyl groups or fluorinated material or another material, such as metal-containing monomers or oligomers. It is also possible to make a polymer using some or all of monomers that are themselves oligomers.

The present invention is further directed to the yarns, fibers, fabrics, webs, finished goods, or other textiles (encompassed herein under the terms "textiles" and "fibrous substrates") treated with the permanent or substantially durable water/soil-resistant fluoropolymer. These fibrous substrates will display comparable textile performance of the untreated textile or other substrate without the wetting/staining of traditional textiles.

These fibrous substrates can be used in a variety of ways including, but not limited to various articles of clothing, including informal garments, daily wear, workwear, activewear and sportswear, especially those for, but not limited to easily wet or stained clothing, such as formal garments, coats, hats, shirts, pants, gloves, and the like; other fibrous substrates subject to wetting or staining, such as interior furnishings and upholstery therefor, carpets, awnings, draperies, upholstery for outdoor furniture, protective covers for barbecues and outdoor furniture, automotive and recreational vehicle upholstery, sails for boats, and the like; and industrial uses, such as those listed in Adanur, S., *Wellington Sears Handbook of Industrial Textiles,* pp. 8–11 (Technomic Publishing Co., Lancaster, Pa., 1995).

The durable water/soil-resistant webs of the present invention are intended to include fabrics and textiles, and may be a sheet-like structure (woven, knitted, tufted, stitch-bonded, or non-woven) comprised of fibers or structural elements. Included with the fibers can be non-fibrous elements, such as particulate fillers, binders, sizes, and the like. The fibrous substrates include fibers, woven and non-woven fabrics derived from natural or synthetic fibers or blends of such fibers, as well as cellulose-based papers, and the like. They can comprise fibers in the form of continuous or discontinuous monofilaments, multifilaments, staple fibers, and yarns containing such filaments and/or fibers, which fibers can be of any desired composition. The fibers can be of natural, manmade, or synthetic origin. Mixtures of natural fibers, manmade fibers, and synthetic fibers can also be used. Examples of natural fibers include cotton, wool, silk, jute, linen, and the like. Examples of man-made fibers include regenerated cellulose rayon, cellulose acetate and regenerated proteins. Examples of synthetic fibers include polyesters (including polyethyleneterephthalate and polypropyleneterephthalate), polyamides (including nylon), acrylics, olefins, aramids, azlons, modacrylics, novoloids, nytrils, aramids, spandex, vinyl polymers and copolymers, vinal, vinyon, Kevlar®, and the like.

To prepare the durable water/soil-resistant webs, the fiber, the yarn, the fabric, or the finished good is exposed (by methods known in the art such as by soaking, spraying, dipping, fluid-flow, padding, and the like) to the metal salt and to the water/soil-resistant fluoropolymer, each of which has been dissolved, suspended, or emulsified in an aqueous solution in either a one-step or a two-step process. The textile-reactive metals of the metal salts may react with the web by coordinate bonding and the water/soil-resistant polymer reacts with the metals, by coordinate bonding, to permanently attach to the web. Alternatively, upon drying, the metals may crosslink the polymer chains to form an insoluble compound that is non-covalently bound to the web. The treated web is then removed from the solution, dried, and cured.

The invention is further directed, in a presently preferred embodiment to the process for treating fibrous substrates with water/soil repellent coatings durable to repeated cleanings, wherein the polymer and the metal of the coating are applied to the fiber, yarn, or textile simultaneously, that is, in a one-step process. This greatly increases the efficiency of the treatment because of cost savings of chemicals and equipment time. The metal salt and the fluoropolymer are mixed together in an aqueous solution and the fiber, the yarn, the fabric, or the finished good is exposed simultaneously to both, by methods known in the art such as by soaking, spraying, dipping, fluid-flow, padding, and the like. The treated web is then removed from the solution, dried, and, if desired, cured.

In another, two-step process for preparing the permanent water/soil resistant webs, the fiber, the yarn, the fabric, or the finished good is exposed to the metal salt dissolved or suspended in an aqueous solution. The textile-reactive metals of the metal salts may react with the web by coordinate bonding. The article is then dried, followed by exposure to the permanent water/soil resistant fluoropolymer suspended in an aqueous solution by methods known in the art such as by soaking, spraying, dipping, fluid-flow, padding, and the like. The water/soil resistant polymer reacts with the metals on the web, by coordinate bonding, to permanently attach to the web. The treated web is then removed from the solution, dried, and cured.

When the process is carried out in one step, it is essential that neither the concentration of the metal, nor the concentration of the group that the metal complexes with be so high as to cause precipitation of the suspended or dissolved polymer. It is also essential that enough metal atoms and metal-complexing groups be present to cause the polymer to be insoluble or substantially insoluble in solvents such as water and tetrachloroethylene, which are used to clean textiles, after the polymer has been dried or cured on a textile. The actual concentrations of the metals and the complexing groups will depend both on the amount of surfactant that may be present in the solution as well as on the number of other polar groups that may be present on the polymer. Such concentrations can be determined by one of skill in the art following standard procedures without undue experimentation.

In the processes of the invention, the concentration of the metal salt in solution can be from about 0.05M to about 1M, preferably from about 0.1M to about 0.4M, more preferably about 0.25M; depending, however, on the characteristics of the particular web to be treated and the particular water/soil resistant fluoropolymer to be attached.

The concentration of the water/soil resistant fluoropolymer in solution can be from about 0.1% to about 25%, preferably from about 1% to about 5%, more preferably about 2.5%; depending, however, on the characteristics of the particular permanent water/soil resistant polymer selected (such as molecular weight or material). The ratio of fluorinated monomer to acidic monomer can vary from about 1:0.75 to about 1:5, preferably from about 1:2.5 to about 1:4, more preferably about 1:3.

The process temperature for either the one- or 2-step process can vary widely, depending on the affinity of the salt for the fibrous substrate and for the water/soil resistant fluoropolymer. However, the temperature should not be so high as to decompose the reactants or so low as to cause inhibition of the reaction or freezing of the solvent. Unless specified to the contrary, the processes described herein take place at atmospheric pressure over a temperature range from ambient temperature to an elevated temperature that is below the boiling point of the solvent used, preferably from about 10° C. to about 110° C., more preferably from about 20° C. to about 60° C., and most preferably at 20° C. Conveniently, the processes will be at ambient temperature. The time required for the processes herein will depend to a large extent on the temperature being used and the relative reactivities of the starting materials. Therefore, the time of exposure of the fibrous substrate to the metal salt and the polymer in solution can vary greatly, for example from about a few seconds to about two hours. Normally, the exposure time will be from a few seconds to ten minutes. Drying is carried out at ambient temperature or at a temperature above ambient, up to about 220° C. The pH of the solution will be dependent on the fibrous substrate being treated. For example, the pH should be kept at neutral to acid or perhaps mildly basic when treating wool, because wool will degrade in strong base, whereas when treating cotton the pH should be kept at mildly acidic to neutral to basic, keeping in mind that metal salts often are insoluble in alkali. However, the solution pH's will probably not be too critical when the fibrous substrate is exposed for only a brief time and if the curing temperature is not too high. Additionally, the deposition of water/soil-resistant polymer with charged groups (e.g., carboxylates, sulfonates, and the like) is expected to be dependent on solution pH. Salts (such as, for example, NaCl, $Na_2SO_4$, etc.) may optionally be added to increase the rate of adsorption of anionic polymers onto the fibers. Unless otherwise specified, the process times and conditions are intended to be approximate.

EXAMPLES

Example 1

3.603 Grams of acrylic acid, 8.931 g FX-13 (3M), 0.106 g AIBN, and 0.483 g mercaptosuccinic acid were dissolved in 29.565 g THF. While stirring, the reaction vessel was purged with nitrogen for a few minutes. The mixture was then heated and held at reflux for 16 hours. The THF/polymer solution may either be used directly or the THF may be removed by rotary evaporation, leaving the "20-mer" polymer behind.

Example 2

A 0.232 M solution of $ZrO(NO_3)_2$ in 95% water/5% isobutanol was padded onto wool. The wool was then dried at 90° C. Next, a solution of 1.76 g fluoropolymer (4 parts acrylic acid, 1 part FX-13, 1% mercaptosuccinic acid, "100-mer"; prepared following the procedure of Example 1) at pH 6.9 in 95% water/5% isobutanol was padded onto wool. The wool was again dried at 90° C. The material was then rinsed for 3 minutes under flowing tap water and dried in the oven at 90° C. The sample was immersed (overnight) in a stirred vessel containing tetrachloroethylene to test the stability of the coating. It was then removed and allowed to dry in the air.

Test for repellency showed that dodecane, water, and an 81% methanol/water mixture beaded up on the surface. Decane wet it.

Example 3

64 Grams of Zonyl TA-N (a fluorochemical acrylate from DuPont), 18 g stearyl acrylate, 15 g polyethylene glycol monoacrylate (Aldrich, $M_n$~375), 3 g calcium acrylate, 0.5 g dodecanethiol, 8 g POE(14) monostearate, 1 g 2,2'-azobis (2-methylpropionamidine) dihydrochloride, 100 g isopropyl alcohol, and 100 g water were homogenized. The calcium acrylate was dissolved in water before it was added. The mixture was then homogenized and heated under nitrogen to 70–80° C. for about 2 hr. This solution was diluted to 20% of its original concentration with water and applied to wool (Burlington Industries 8823 tan wool). The wool was padded to ~100% wet pickup and dried and cured in an oven for 18 min. The temperature in the oven rose during this period from 105° C. to 140° C. The water and oil repellencies of these samples were then measured both before and after immersion in rapidly-stirred tetrachloroethylene (TCE). The following Table gives the oil repellency as measured by the AATCC test method (see below) as a function of time.

| Hours in TCE | 0 | 1 | 1.5 | 2 | 4 | 16.2 | 18 |
|---|---|---|---|---|---|---|---|
| AATCC Rating | 7.33 | 6.66 | 6.66 | 7.0 | 6.66 | 6.33 | 6.33 |

Oil Repellency Measurement

The oil repellency (OR) of a treated substrate is measured by the American Association of Textile Chemists and Colorists (AATCC) Standard Test Method No. 118-1983, which test is based on the resistance of treated substrate to penetration by oils of varying surface tensions. Treated substrates resistant only to Nujol.RTM mineral oil (the least penetrating of the test oils) are given a rating of 1, whereas treated substrates resistant to heptane (the most penetrating of the test oils) are given a rating of 8. Other intermediate values are determined by use of other pure oils or mixtures of oils, as shown in the following Table.

| Standard Test Liquids AATCC Oil Repellency | |
|---|---|
| Rating Number | Composition |
| 1 | Nujol.RTM |
| 2 | Nujol.RTM/n-Hexadecane (65/35) |
| 3 | n-Hexadecane |
| 4 | n-Tetradecane |
| 5 | n-Dodecane |
| 6 | n-Decane |
| 7 | n-Octane |
| 8 | n-Heptane |

What is claimed is:

1. A copolymer comprising i) an acid-containing monomer, ii) a metal-containing monomer, and iii) a fluorinated monomer, said copolymer incorporating metal atoms with a formal charge of 2 or greater.

2. A copolymer according to claim 1 wherein said fluorinated monomer has the structure:

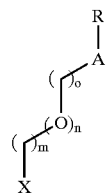

Formula I wherein:
m is 0 to 2;
n is 0 or 1;
o is 1 or 2;
A is $-SO_2-$, $-N(W)-SO_2-$, $-CONH-$, $-CH_2-$, or $-CF_2-$;
R is a linear, branched, or cyclic fully- or partially-fluorinated hydrocarbon;
W is hydrogen or $C_1-C_4$ lower alkyl; and
X is acrylate ($H_2C=CHCO_2-$), methacrylate ($H_2C=C(CH_3)CO_2-$), or a carbon—carbon double bond ($H_2C=CH-$).

3. A copolymer according to claim 1 wherein said metal-containing monomer is selected from the group consisting of calcium acrylate, magnesium acrylate, aluminum acrylate, chromium acrylate, calcium styrene sulfonate, magnesium styrene sulfonate, aluminum styrene sulfonate, and chromium styrene sulfonate.

4. A copolymer according to claim 1 wherein said acid-containing monomer is selected from the group consisting of acrylic acid, methacrylic acid, maleic anhydride, maleic acid, crotonic acid, itaconic acid, and mixtures thereof.

5. A copolymer according to claim 1 wherein said copolymer comprises at least one block of said acid-containing monomers and at least one block of said fluorinated monomers.

6. A copolymer according to claim 1 wherein said copolymer comprises at least one block of hydrophilic monomers, which hydrophilic monomers are concentrated to one end of the copolymer.

7. A copolymer comprising i) an acid-containing monomer or an acid-containing monomer precomplexed with metal atoms having a formal charge of 2 or greater, and ii) a fluorinated monomer, said copolymer having reactive groups that can coordinately bind with metal atoms having a formal charge of 2 or greater if the metal atom is not already precomplexed in the acid-containing monomer.

8. A copolymer according to claim 7 wherein said fluorinated monomer has the structure:

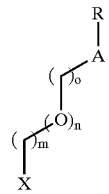

Formula I wherein:
m is 0 to 2;
n is 0 or 1;
o is 1 or 2;
A is $-SO_2-$, $-N(W)-SO_2-$, $-CONH-$, $-CH_2-$, or $-CF_2-$;

R is a linear, branched, or cyclic fully- or partially-fluorinated hydrocarbon;

W is hydrogen or $C_1$–$C_4$ lower alkyl; and

X is acrylate ($H_2C=CHCO_2—$), methacrylate ($H_2C=C(CH_3)CO_2—$), or a carbon—carbon double bond ($H_2C=CH—$).

9. A copolymer according to claim 7 wherein said acid-containing monomer is selected from the group consisting of acrylic acid, methacrylic acid, maleic anhydride, maleic acid, crotonic acid, itaconic acid, and mixtures thereof.

10. A copolymer according to claim 7 wherein said copolymer is a diblock copolymer comprising at least one block of said acid-containing monomers and at least one block of said fluorinated monomers.

11. A copolymer according to claim 7 wherein said copolymer is a diblock copolymer comprising at least one block of hydrophilic monomers, which hydrophilic monomers are concentrated to one end of the copolymer.

* * * * *